United States Patent [19]

Bailey

[11] Patent Number: 4,961,813
[45] Date of Patent: Oct. 9, 1990

[54] SERVICER FOR TIRE BUILDING MACHINE

[75] Inventor: David W. Bailey, Waterloo, Canada

[73] Assignee: The Uniroyal Goodrich Tire Company, Akron, Ohio

[21] Appl. No.: 198,888

[22] Filed: May 26, 1988

[51] Int. Cl.⁵ .............................................. B29D 30/44
[52] U.S. Cl. ................................. 156/406.4; 156/353; 156/362; 156/405.1
[58] Field of Search .................. 156/405.1, 406, 406.2, 156/406.4, 406.6, 396, 111, 123, 124, 128.1, 130, 133, 362–364, 378, 353–355; 226/108–110, 93; 198/690.1, 679, 861.2, 861.3

[56] References Cited

U.S. PATENT DOCUMENTS

| | | | |
|---|---|---|---|
| 793,557 | 6/1905 | Adams | 198/861.3 |
| 1,762,772 | 6/1930 | Fisher | 198/861.3 |
| 3,537,936 | 11/1970 | Leblond | 156/405.1 |
| 3,647,126 | 3/1972 | Dieterich et al. | |
| 3,795,563 | 3/1974 | Enders et al. | |
| 3,841,941 | 10/1974 | Leblond et al. | |
| 3,898,116 | 8/1975 | Katagiri et al. | |
| 3,993,530 | 11/1976 | Henley et al. | |
| 4,105,487 | 8/1978 | Suzuki et al. | 156/406.4 |
| 4,333,788 | 6/1982 | Klose | |
| 4,409,872 | 10/1983 | Bertoldo | |
| 4,457,802 | 7/1984 | Yanagihara et al. | |
| 4,474,338 | 10/1984 | Hirano et al. | |
| 4,545,718 | 10/1985 | Marshall | 156/406.4 |
| 4,769,104 | 9/1988 | Okuyama et al. | 156/406.4 |

Primary Examiner—David Simmons
Assistant Examiner—Geoffrey L. Knable
Attorney, Agent, or Firm—Michael J. Colitz, Jr.; Alan A. Csontos

[57] ABSTRACT

A servicer for conveying upper and lower breaker strip material onto a rotating cylindrical surface comprising upper and lower conveyors, each with an input end and output end, to sequentially feed the upper and lower breaker strip material along upper and lower paths of travel onto the rotating cylindrical surface; a roll of breaker strip material located in association with each conveyor at its input end; positioning means to sequentially move and pivot the output end of each conveyor between a first position in operative association with the rotating cylindrical surface and a second position remote therefrom; cutter means in each path of travel to cut the conveyed breaker strip material into strips of predetermined lengths; and drive means associated with the conveyors to move the cut breaker strips onto the rotating surface.

12 Claims, 10 Drawing Sheets

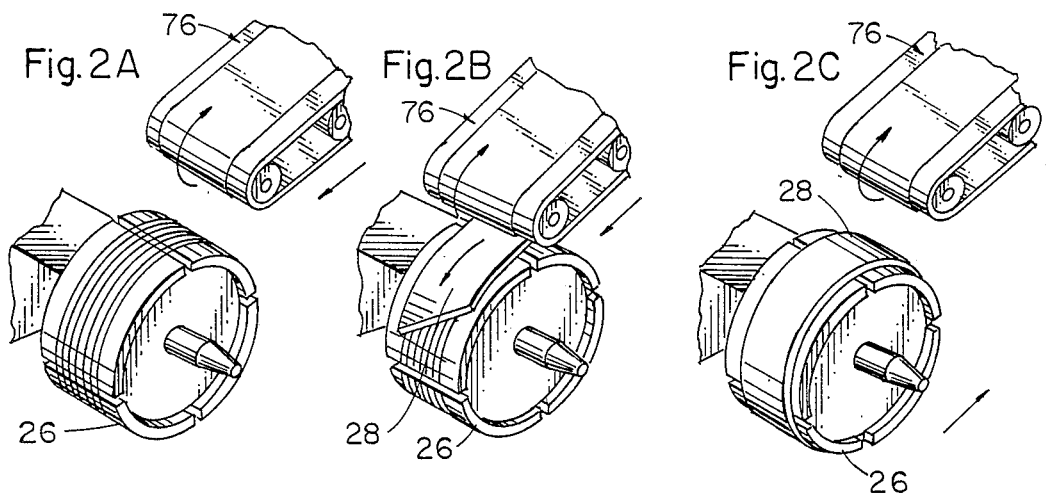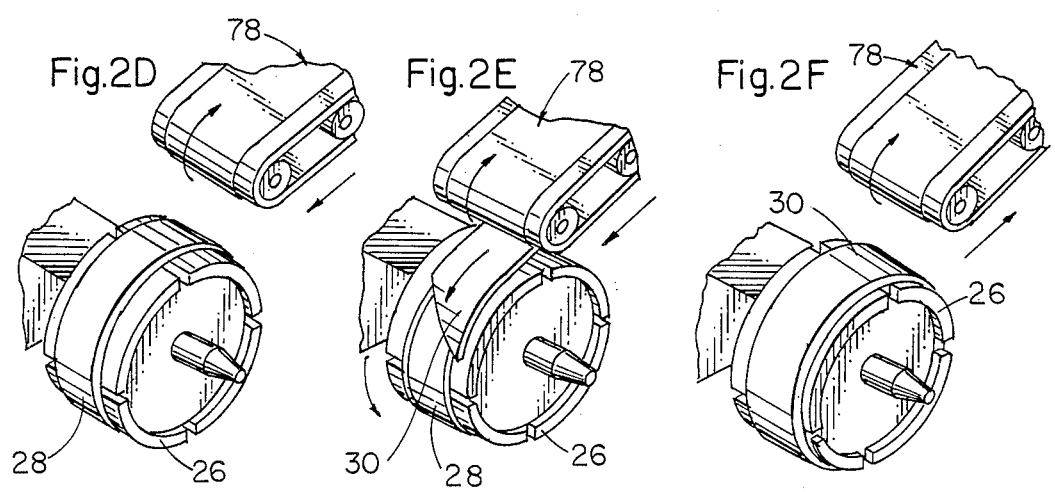

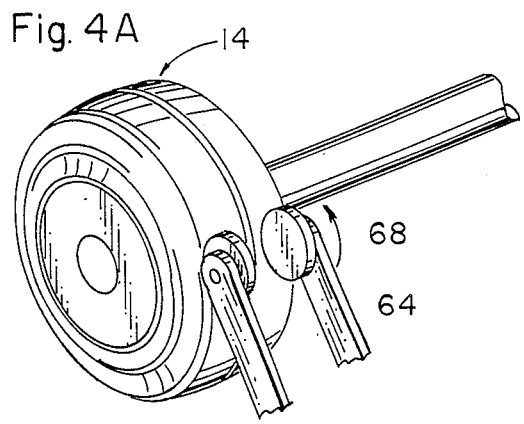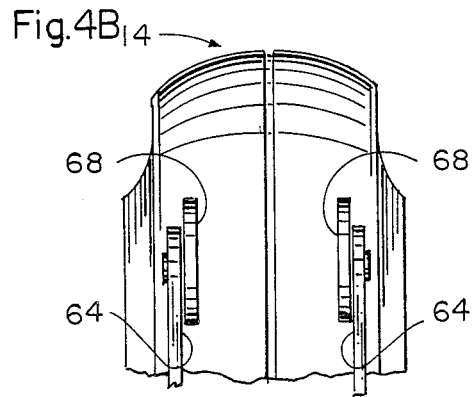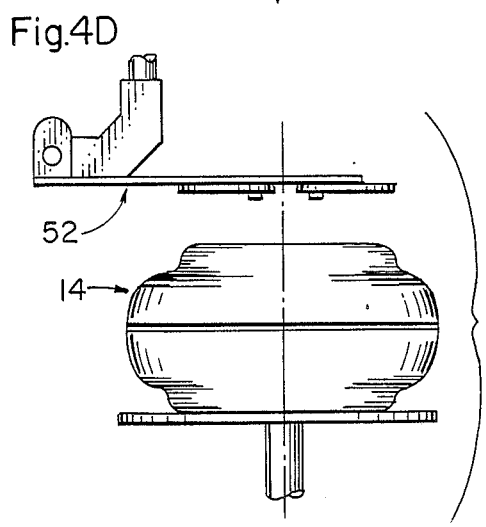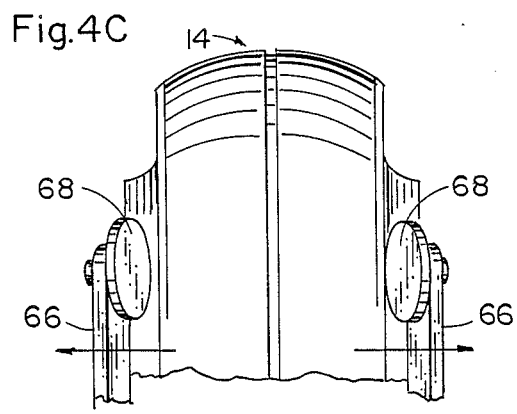

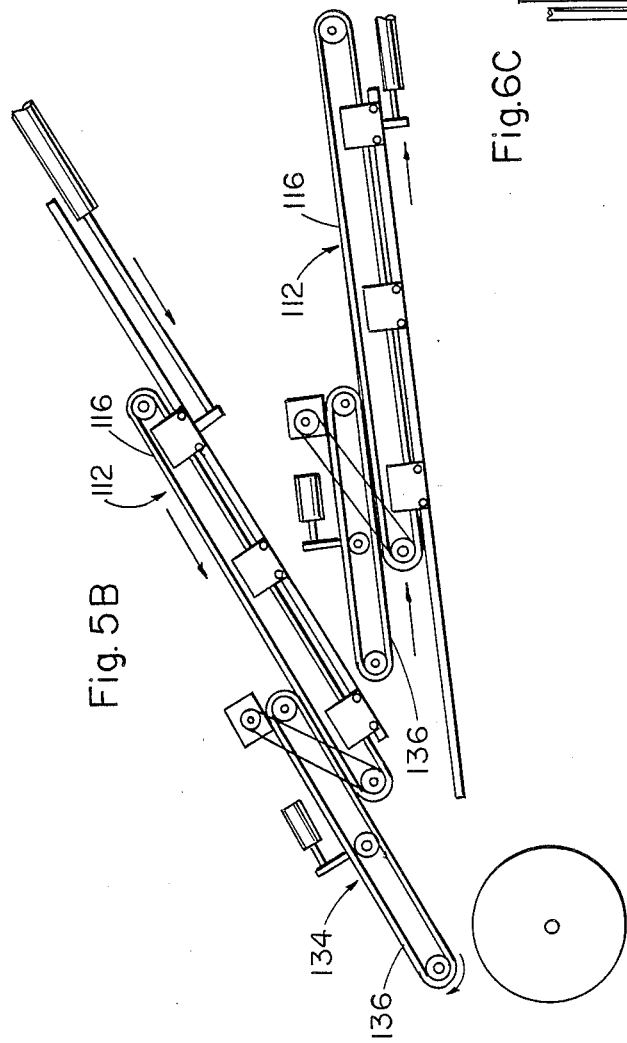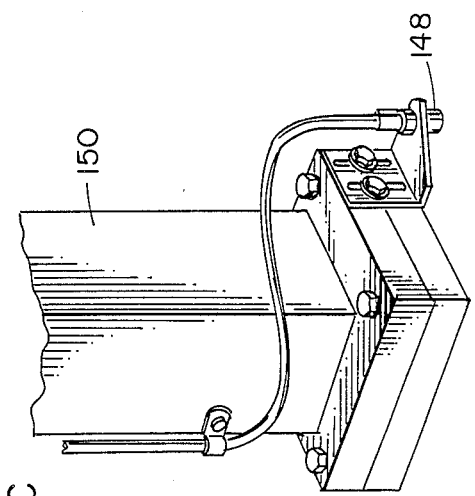

SERVICER FOR TIRE BUILDING MACHINE

BACKGROUND OF THE INVENTION

1. Field of the Invention

This invention relates to an automatic servicer for tire building machines and, more particularly, to a continuous and automatic servicer for feeding, aligning and cutting breaker strip material to a breaker drum of a second stage tire building machine.

2. Description of the Background Art

Pneumatic tires of the bias type have been generally built commercially in a "flat band" and subsequently expanded to the toroid shape in a curing mold. While building such tires, the strip material including the tread strips are applied directly over a laminated carcass while in a flat band orientation.

Conversely, pneumatic tires of the radial type are generally built commercially by the "toroid" method. This method requires a first stage tire building machine for constructing the carcass in a flat band configuration and a second stage tire building machine for constructing the breaker and tread strips and applying them to the carcass. At the second stage machine, the carcass is supported on a first drum where it is expanded into a toroid shape. The tread and breaker strips are separately built on a second drum and then transferred onto the periphery of the supported carcass to form the green tire ready for vulcanization.

Various approaches to tire building machines and their components are disclosed in the literature. Note for example, U.S. Pat. Nos. 3,795,563 to Enders; 3,841,941 to Leblond and 3,898,116 to Katagiri. All of these patents disclose surfaces with sheet-feed mechanisms for delivering material from a plurality of rolls to a processing drum. In addition, U.S. Pat. Nos. 4,333,788 to Klose; 4,409,872 to Bertoldo; 4,457,802 to Yanagihara and 4,474,338 to Peramo all disclose sheet-feed mechanisms in a servicer for delivering cut sheets to a drum wherein the output end of the sheet-feed mechanism is movable to insure proper positioning of the leading of the sheet material onto the drum. Additionally, U.S. Pat. Nos. 3,647,126 to Dieterich and 3,993,530 to Henley disclose mechanisms for use in feeding sheet material on a tire machine servicer for insuring precise feed and alignment of the fed sheet material. Although many such advances are noteworthy to one extent or another, none achieves the objective of an effective, efficient and economical tire building machine which is continuous and automatic in its operation.

As illustrated by the great number of prior patents as well as commercial devices, efforts are continuously being made in an attempt to improve tire building machines and methods to render them more efficient, effective and economical. None of these previous efforts, however, provides the benefits attendant with the present invention. Additionally, prior tire building machines do not suggest the present inventive combination of method steps and component elements arranged and configured as disclosed and claimed herein. The present invention achieves its intended purposes, objects and advantages over the prior art devices through a new, useful and unobvious combination of component elements, with the use of minimum number of functioning parts, at a reasonable cost to manufacture, and by employing only readily available materials.

Therefore, it is an object of this invention to provide an improved servicer for conveying upper and lower breaker strip material onto a rotating cylindrical surface comprising upper and lower conveyors, each with an input end and output end, to sequentially feed the upper and lower breaker strip material along upper and lower paths of travel onto the rotating cylindrical surface; a roll of breaker strip material located in association with each conveyor at its input end; positioning means to sequentially move and pivot the output end of each conveyor between a first position in operative association with the rotating cylindrical surface and a second position remote therefrom; cutter means in each path of travel to cut the conveyed breaker strip material into strips of predetermined lengths; and drive means associated with the conveyors to move the cut breaker strips onto the rotating surface.

It is an additional object of the invention to continuously and automatically feed, align and cut material to a rotating breaker drum of a second stage tire building machine.

Lastly, it is an object of the present invention to build tires on a second stage tire building machine more efficiently, rapidly and economically.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention may be incorporated into a servicer for conveying upper and lower breaker strip material onto a rotating cylindrical surface comprising upper and lower conveyors, each with an input end and output end, to sequentially feed the upper and lower breaker strip material along upper and lower paths of travel onto the rotating cylindrical surface; a roll of breaker strip material located in association with each conveyor at its input end; positioning means to sequentially move and pivot the output end of each conveyor between a first position in operative association with the rotating cylindrical surface and a second position remote therefrom; cutter means in each path of travel to cut the conveyed breaker strip material into strips of predetermined lengths; and drive means associated with the conveyors to move the cut breaker strips onto the rotating surface.

The positioning means individually moves the output end of each conveyor longitudinally along its length and pivotally with respect thereto. The servicer further includes an additional conveyor to feed precut strips of tread material onto the rotating surface over the breaker strips. The additional conveyor means is located on the side of the rotating surface remote from the upper and lower conveyors. The additional conveyor means is movable between a position adjacent to the rotating surface and to a position remote therefrom. The servicer further includes a programmable controller to coordinate and effect the moving and pivoting of the conveyors. The movement of the additional conveyor means is coordinated and effected by the controller means.

The invention may also be incorporated in a tire building machine servicer with material feeding apparatus for sequentially conveying breaker strips with magnetic cords onto a rotating drum, the apparatus comprising conveyor means with an input end and an output end to sequentially convey the leading edge of each breaker strip onto the rotating surface, the conveyor means having belt means with magnets located on the side thereof remote from the conveyed material; a source of breaker material located in association with the input end of the conveyor means; positioning means to sequentially move and pivot the output end of the conveyor means between a first position in operative association with the surface and a second position remote therefrom; and drive means in association with the conveyor means to convey the cut breaker strips onto the rotating surface.

The material feed apparatus further includes detector means to sense the length of cut breaker strip material and to vary, in response thereto, the relative speed between the drive means and the rotating surface. The conveyor means includes an input conveyor portion, an intermediate conveyor portion and an output conveyor portion, the input and intermediate conveyor portions having their magnets beneath their belts for conveying fed material thereabove and the output conveyor portion having its magnets above its belt for conveying fed material therebeneath. The output end of the output conveyor is movable between a position with its output end in operative proximity to the rotating drum and a retracted position wherein at least a portion of the output conveyor portion overlies at least a portion of the intermediate conveyor portion. The sheet feed apparatus further includes first additional drive means to longitudinally shift the output conveyor portion and second additional drive means to rotatably pivot the output conveyor portion.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIGS. 2A-2F are illustrations showing the sequential movement of breaker strips from the servicer to the collapsible drum.

FIGS. 4A-4D are illustrations showing the movement of the stitcher upon the breaker and tread cylinder at the first station with FIG. 4D illustration the stitched green tire placed upon the table of the output station.

FIGS. 5A and 5B are side elevational views of the sheet feeding mechanisms of the servicer in various operational positions.

FIGS. 6A-6C are perspective illustrations of the various components of the cutter and aligner mechanisms.

Similar reference characters refer to similar parts through the several views of the drawings.

DETAILED DESCRIPTION OF THE INVENTION

Overview

Figure 1:
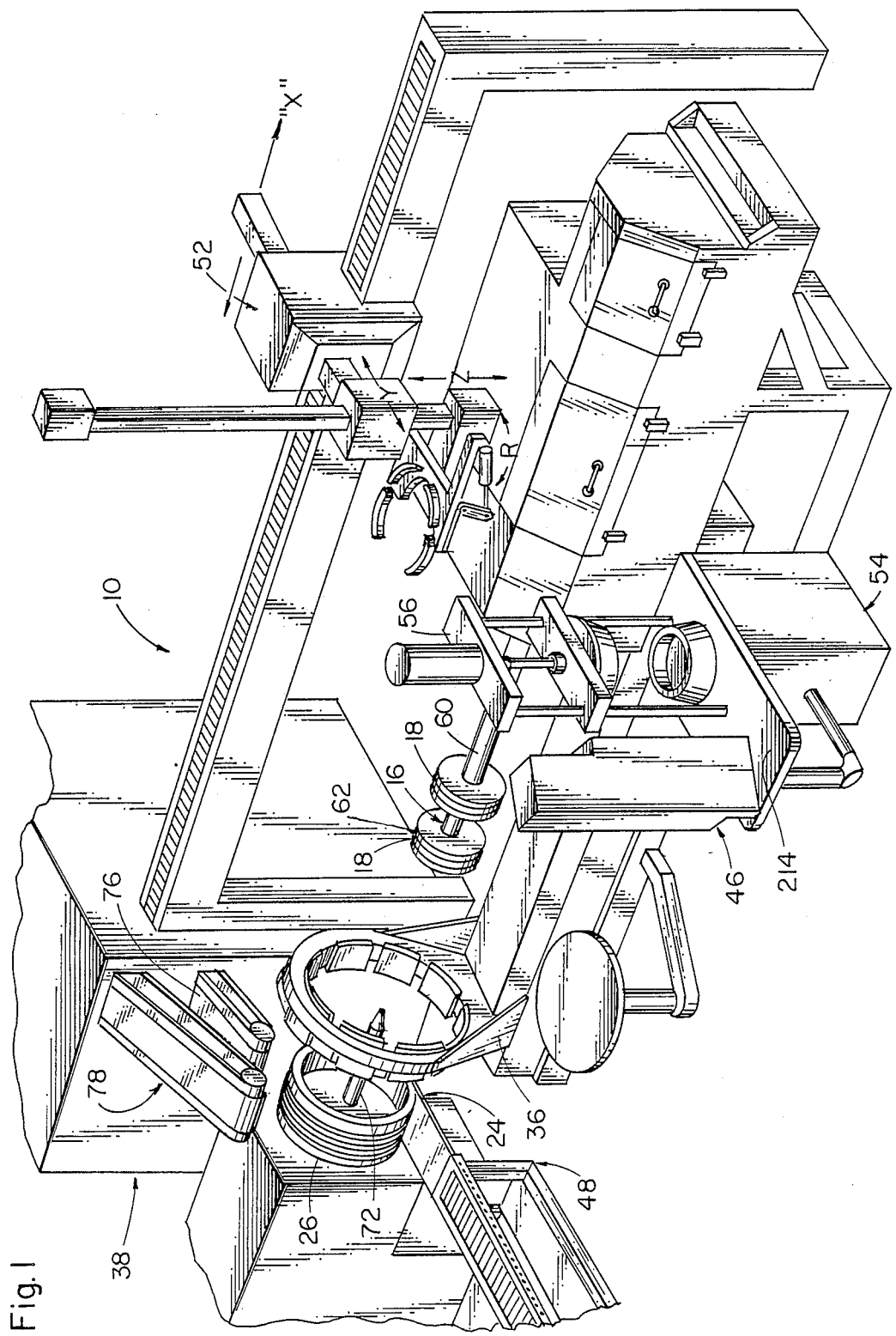
FIG. 1 is a perspective illustration of a second stage tire building machine constructed in accordance with the principles of the present invention.
Figure 3A:
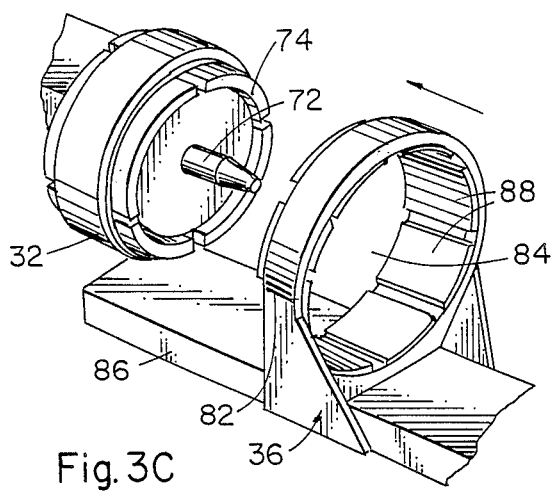
FIGS. 3A-3F are perspective illustrations showing the sequential movement of a breaker and tread cylinder from the collapsible drum to the first stage tire carcass.
Figure 3B:
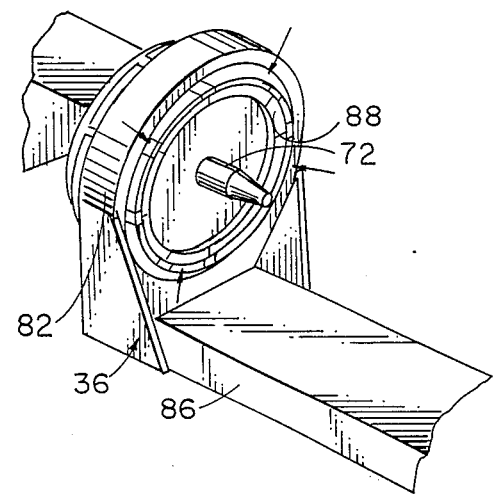
Figure 3C:
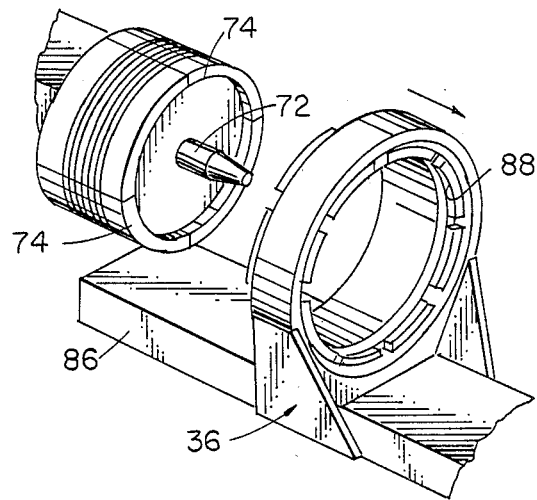
Figure 3D:
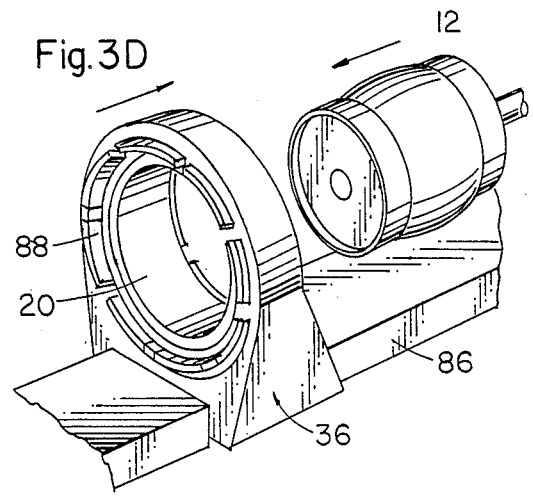
Figure 3E:
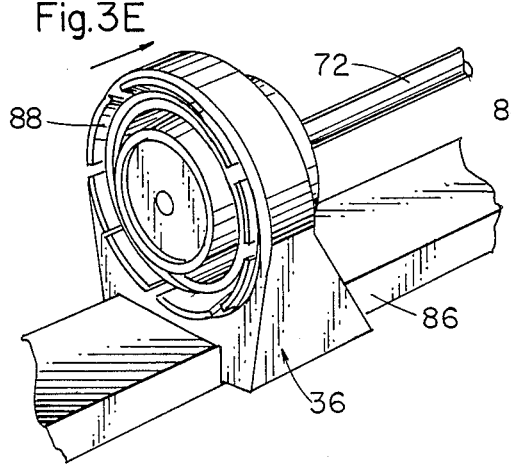
Figure 3F:
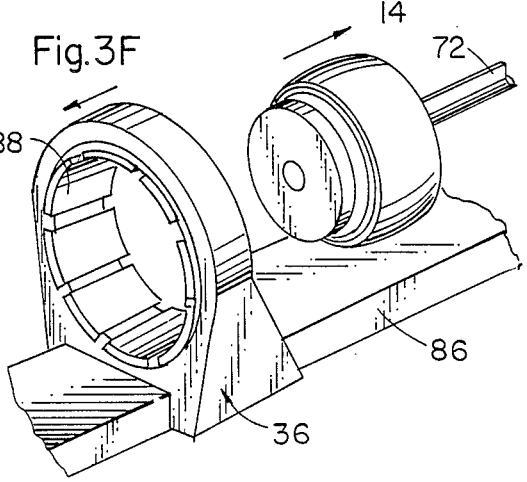

The second stage tire building machine 10 of the present invention is depicted in the attached drawings. It is comprised of a plurality of assemblies, subassemblies and components operable together for its purpose of converting a generally cylindrically shaped carcass 12 into a toroid-shaped green tire 14 ready for vulcanization. The machine includes a first or carcass drum assembly or station 16 formed of spaced flanges 18 adapted to receive and support the carcass 12. It functions to expand the carcass 12 into a toroid shape for the receipt of a breaker and tread cylinder 20 for the formation of the green tire.

The machine also includes a second or breaker drum assembly or station 24 formed of a collapsible drum 26 rotatable about an axis aligned with, but axially offset from, the axis of the flanges 18 of the carcass drum assembly. The breaker drum is adapted to receive strips of breaker material 28 and 30 and a strip 32 of tread material and to position them in a superposed relationship to form the breaker and tread cylinder. The breaker and tread cylinder is then transported axially from the breaker drum assembly 24 to the carcass 12 at the carcass drum assembly 16 by a transport ring 36 which is axially shiftable between the two drum assemblies.

A third assembly is the servicer assembly or station 38 which is adapted to convey breaker material along paths of travel from supply rolls 40 and 42, past cutter and tip aligner subassemblies 44, to the breaker drum 26. The conveying of the breaker material is at an appropriate speed and in an appropriately timed sequence to effect the desired result of a continuous and repeatable breaker tread cylinder. The servicer assembly includes the framing support structures as well as the conveyor belts and control mechanisms 46 for effecting the appropriate conveying of the breaker material to the breaker drum. The control mechanisms include belts, pulleys and sensors to input a controller for determining material position and thus allow for the intended operation and control of the machine. A tread conveyor 48, operable in association with the servicer, functions for feeding precut strips 32 of tread material onto the surface of the superposed strips 28 and 30 of breaker material on the breaker drum 26.

The machine also includes a robot assembly 52 for conveying the tire carcass 14 from a loading station 54 to the carcass drum assembly. The loading station includes a pre-inflator 36 where the carcass 12 is initially placed by an operator after being carried or otherwise transported from a first stage tire building machine, the place of carcass fabrication. The robot assembly 52 is also adapted to convey the carcass with the breaker and tread cylinder stitched thereto, the green tire 14 ready for vulcanization, to a final or inspection station whereat the operator may view and inspect the green tire and then carry or otherwise transport such green tire to the curing press for vulcanization.

Also included within the machine is an operator programmable control assembly 46 for coordinating the operation of the various assemblies, subassemblies and components in their intended continuous and automatic cycle of operation with minimum operator involvement.

Drum Assemblies

The carcass drum assembly 16 includes a cantilevered member 60 with a free outboard end and an inboard end supported by the machine for rotation by suitable drive mechanisms. Adjacent to its outboard end are a pair of carcass-receiving flanges 18 of similar construction, an inboard flange and an outboard flange. Each flange is of a generally conical configuration for receiving the internal edges of a carcass 12. The carcass-receiving surface of each flange is provided with an elastomeric membrane 62 which communicates by internal conduits with a source of air under pressure whereby the membranes may be inflated to sufficiently increase in diameter to form an air-tight seal with a supported carcass. A further source of air under pressure is coupled with the interior of the carcass through a conduit in the member for the inflation of the carcass supported by the flanges. Such air flows are conventional.

The flanges 18 are mounted on the cantilevered member or shaft 60 through a concentric shaft and the sleeve arrangement. The outboard flange supported by the shaft and inboard flange supported by the sleeve are axially shiftable by drive mechanisms toward and away from each other equally and oppositely. Movement toward each other is performed concurrently with the inflation of the carcass in order to convert the cylindrical carcass into a toroid shape. As a result of the construction and arrangement of the components of the carcass drum assembly, the supported carcass is deformed and inflated in order to receive a breaker and tread cylinder 20 brought into an encompassing position by the transfer ring. With the transfer ring 36 and the breaker and tread cylinder encircling the inflated carcass, the carcass is further inflated to contact the interior surface of the breaker and tread cylinder for adhesion therebetween. The transfer ring is expanded to release the breaker and tread cylinder. The transfer ring is then axially displaced toward the breaker drum to an intermediate location for exposing the periphery of the breaker and tread cylinder. Note FIGS. 3A through 3F for the sequence.

A stitcher 64, located adjacent the flanges 18 and pivoted on arms 66, is then brought into contact with the periphery of the breaker and tread cylinder 20. Its opposed wheels 68 rotate, through the rotation of the carcass and breaker and tread cylinder, and are driven concurrently away from each other to stitch the breaker and tread cylinder onto the carcass, thereby forming the green tire ready for vulcanization in the curing press. Note FIGS. 4A, 4B and 4C.

The breaker drum subassembly 24 includes a collapsible drum 26 rotatable about an axis which is coextensive with, but offset from, the axis of the flanges 18 of the carcass drum assembly 16. The breaker drum assembly includes a cantilevered shaft 72 with a free outboard end and an inboard end supported and driven by the machine. Its outboard end supports the collapsible breaker drum 26 which is located at an axially spaced interval from the carcass drum assembly.

A motion imparting linkage arrangement is adapted to radially displace a plurality of segments 74, two opposite segments greater than 90 degrees and the other two segments less than 90 degrees, as shown in the preferred embodiment. The segments function to effectively expand and contract the breaker-supporting surface of the breaker drum. This action will allow a constructed breaker and tread cylinder to be supported by the breaker drum when the segments are expanded or removed therefrom by the transfer ring when the segments are contracted. Compare FIGS. 3A and 3C.

The breaker drum 26 is adapted to be rotated through the shaft 72 whereby it will receive and support a first applied breaker strip 28 from the first conveyor 76 of the servicer assembly and a subsequently applied second breaker strip from another or second conveyor 78 of the servicer assembly. The first breaker strip will completely overlie the surface of the expanded breaker drum with no overlap or gap at its opposite ends. The second breaker strip is slightly longer than the first since it will overlie the first breaker strip on the breaker drum, also with no overlap or gap between its opposite ends. The breaker strips, when together on the breaker drum, form the breaker cylinder. The cutting of the breaker strips and their positioning onto the breaker drum is effected without operator involvement in a continuous and automatic cycle of operation.

Overlying the second breaker strip is the tread strip 32, fed to the rotating breaker drum from the side thereof opposite the servicer. In operation and use, the breaker and tread strips are fed into superposed position onto the breaker drum to form the breaker and tread cylinder. The only operator involvement is the placing of the tread strip on its conveyor 48 and the hand stitching of the trailing edge of the tread strip for completion of the breaker and tread cylinder to be attached to the carcass.

The transfer ring subassembly 36 includes a shiftable member 82 with a circular aperture 84 having an internal diameter greater than the external diameter of the breaker and tread cylinder. The aperture has its axis aligned with the axis of the carcass and breaker drum subassemblies for movement therebetween. Its lower end is supported on rails 86 for movement between its opposite end positions.

A plurality of segments 88, eight in the disclosed preferred embodiment with arcuate interior surfaces, are adapted to move radially toward and away from the axis of the ring. Their open positions are radially removed from the axis of the ring, but they are movable radially interiorly to closed positions to grasp the breaker and tread cylinder.

With the breaker and tread cylinder gripped by the transfer ring, the breaker drum is then collapsed to a reduced diameter so that the transfer ring may contact, grasp and then axially shift the breaker and tread cylinder to a position over and encompassing the carcass. Note the sequence shown in FIGS. 3A through 3F. The carcass is then expanded to contact the breaker and tread cylinder for adherence therebetween. The transfer ring is then expanded to release the breaker and tread cylinder and then move to a location between the two drum assemblies during the final stitching of the green tire. Thereafter, the transfer ring is moved to encompass the stitched green tire through the contraction of its segments. The exhausting of the air from the green tire and the separation of the flanges releases the green tire from the carcass drum assembly. The transfer ring then moves the green tire to a location between the drum assemblies where it is picked up by the robot. The segments are then expanded and the transfer ring returned to the breaker drum assembly to pick up the next breaker and tread cylinder while the robot conveys the green tire to the inspection station.

Servicer Assembly

The servicer assembly 38 may be considered as comprising the structures of the material support subassembly 40 and 42, the breaker feed subassembly 76 and 78 for conveying the breaker material to the breaker drum, and the cutter and tip aligner subassembly 44 located along the path of travel of the breaker material for cutting the breaker material fed from a supply roll into strips and for feeding such strips to the breaker drum. The servicer assembly also functions in association with the tread feed subassembly 48 located adjacent to the breaker drum but remote from the servicer assembly for feeding previously cut strips of tread material to the breaker drum.

The support subassembly includes a plurality of interconnected channel irons and other supporting hardware and frames for the breaker feed subassembly and the cutter and tip aligner subassembly. The support assembly defines a path of movement for the fed breaker material from the rolls 40 and 42 to the breaker drum 26 by the sheet feed subassembly 76 and 78. Two such rolls, two sheet feed subassemblies and two cutter and tip aligner subassemblies are disclosed in the preferred embodiment to accommodate a tire being fabricated of two individual strips of breaker material. Any number of breakers, either more or less, could be utilized with a corresponding number of rolls and sheet feed and cutter and tip aligner subassemblies and sheet feed paths.

The support subassembly also includes conventional frames for a preliminary conveyor 92, one for each sheet feed subassembly. Each frame has spaced rollers 94 supporting an inclined belt 96 with an upper surface located to allow an operator to manually adhere or stitch the trailing edge of a prior fed roll with the leading edge of the next following roll to be fed. The breaker material is then adapted to festoon or sag at 98 downwardly from the output end of the preliminary conveyor. The festooning of the breaker material allows the material to be easily withdrawn by a subsequent conveyor from a driven, rotatable supply roll without excessive forces which might otherwise withdraw materials irregularly resulting in imprecise feeding of the breaker material. A sensor is located to determine the extent or length of the festooned loop and to increase or decrease the speed of the preliminary conveyor and feed roll appropriately for maintaining the length of the festooned material within pre-selected limits. A loop which is too short might result in imprecise feeding of the fed material along with the stretching of the material. Similarly, a loop which is too long might also result in stretching of the fed material due to its weight. A device appropriate for this sensing and controlling function is a Sonitrol sensor manufactured and sold by Waddington Electronics, Inc., a corporation of the State of Rhode Island.

Thereafter, the material is fed upwardly to the inclined input end of the input conveyor 102 and across an essentially horizontal stretch, terminating at a cutter and tip aligner subassembly 44. Guide rollers 104, one of which is driven by a motor, support the belt of the input conveyor. Prior to the belt of the input conveyor belt, a series of parallel rollers 106 overlie a plate at its edges to align the material prior to its contact with the belt. A second series of parallel rollers 108, perpendicular to the rollers of the first series, maintains the fed material in proper alignment centered on the conveyor belt. The rollers of the first and second series are adjustable toward and away from each other and the longitudinal center line of the plate and belt to accommodate the feeding and centering of breaker material of different widths. Idler rollers extend entirely across the path of travel at the curve of the input conveyor.

At the input end of each input conveyor there is located a width sensor. Each sensor extends across the entire sheet feed path for the precise determination of the fed breaker material width at any particular time. This information is fed to the machine controller or programmer in combination with the timing belt position information, as is described hereinafter, so that the width of the sheet material in the cutter and tip aligner will be known precisely at the time the cutting and tip alignment is to be effected. This allows the precise cutting and tip alignment as a function of the location and width of the breaker material having been moved from the width sensor to the cutting and tip aligner location.

The cutter and tip aligner subassembly 44 is located between the output end of the input conveyor and the input end of the intermediate conveyor 112.

The input and intermediate conveyors include conveyor belts 114 and 116 upon which the breaker material rests and moves. Supporting rollers 118, one of which is driven, support the ends of the belt of each of the intermediate and input conveyor. Each intermediate conveyor is supported on brackets 120 which are longitudinally reciprocable on slide rails 122 of the frames of the support assembly. An air cylinder 124 has its piston secured to the brackets for independently reciprocating each intermediate conveyor longitudinally along the sheet feed path.

The various conveyor belts described herein are actually timing belts. They are each formed with internal toothed surfaces 126 cooperable with belt pulleys having drive teeth for the accurate movement of the belts with respect to their pulleys, as well as the conveyed material along with sheet feed path. This arrangement allows for the accurate positioning of the belts and material through the conveyor system. The output from the drive pulleys may then precisely provide input signals to the controller for the overall precise and accurate operation of the tire building machine.

Beneath the belts of the input and intermediate conveyors is a series of magnets 128 and 130 adapted to attract the breaker material due to its steel cords. This attraction allows for a precise positioning of the breaker material as set by the rollers prior to the belts of the input conveyor. This attraction also allows for the precise movement of the breaker material along the path of travel as determined by the movement of the conveyor belts.

Located adjacent to the output end of the intermediate conveyor is an output conveyor 134 also formed as a belt 136, with support rollers 138, one of which is driven, and with magnets 140 on the side of the belt remote from the breaker material being fed. The output conveyor, however, is a bottom-feed conveyor adapted to accurately lift the cut breaker strips through magnets from the intermediate portion of the conveyor for delivery onto the breaker drum.

Figure 5A:
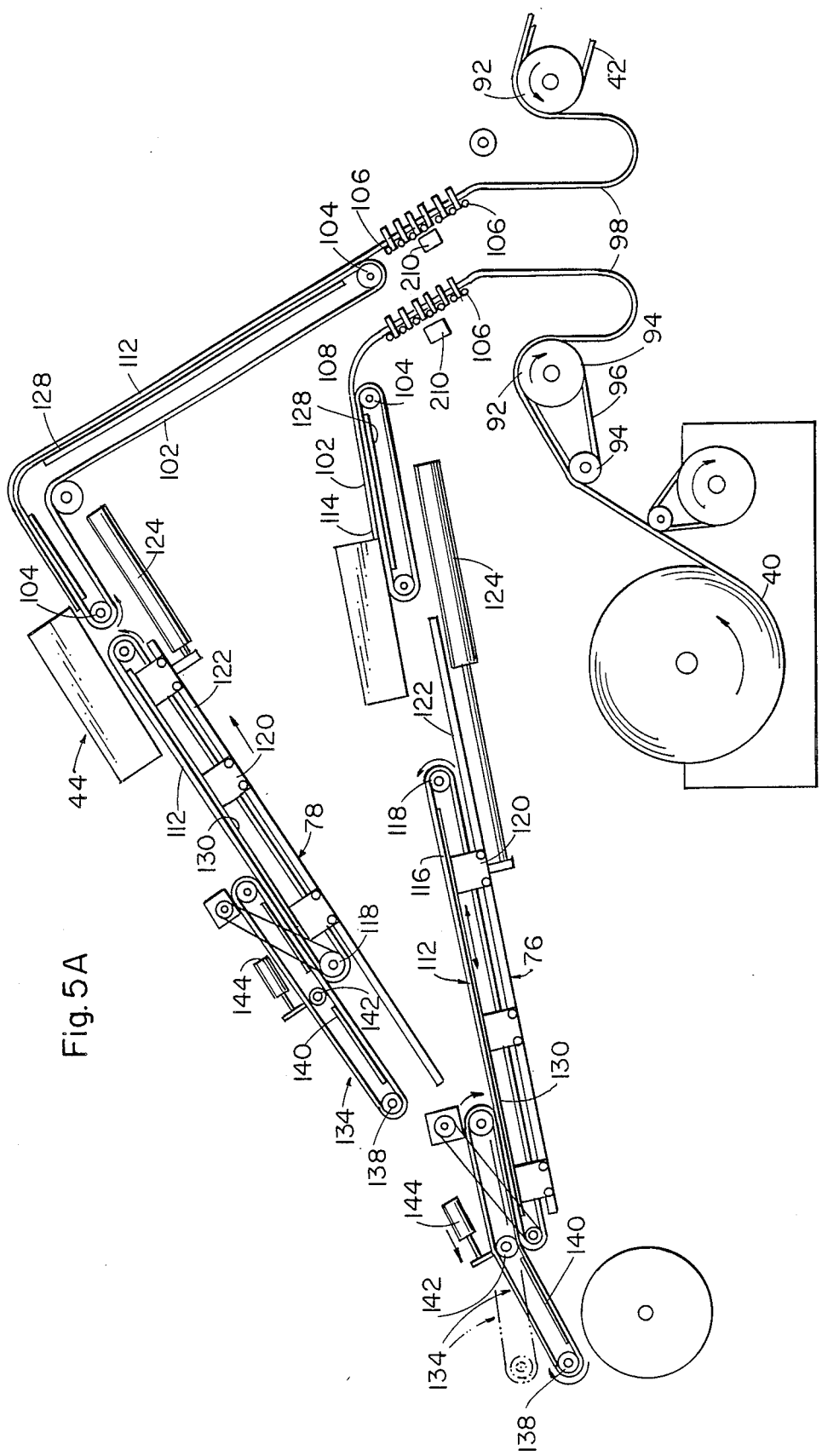
Figure 6A:
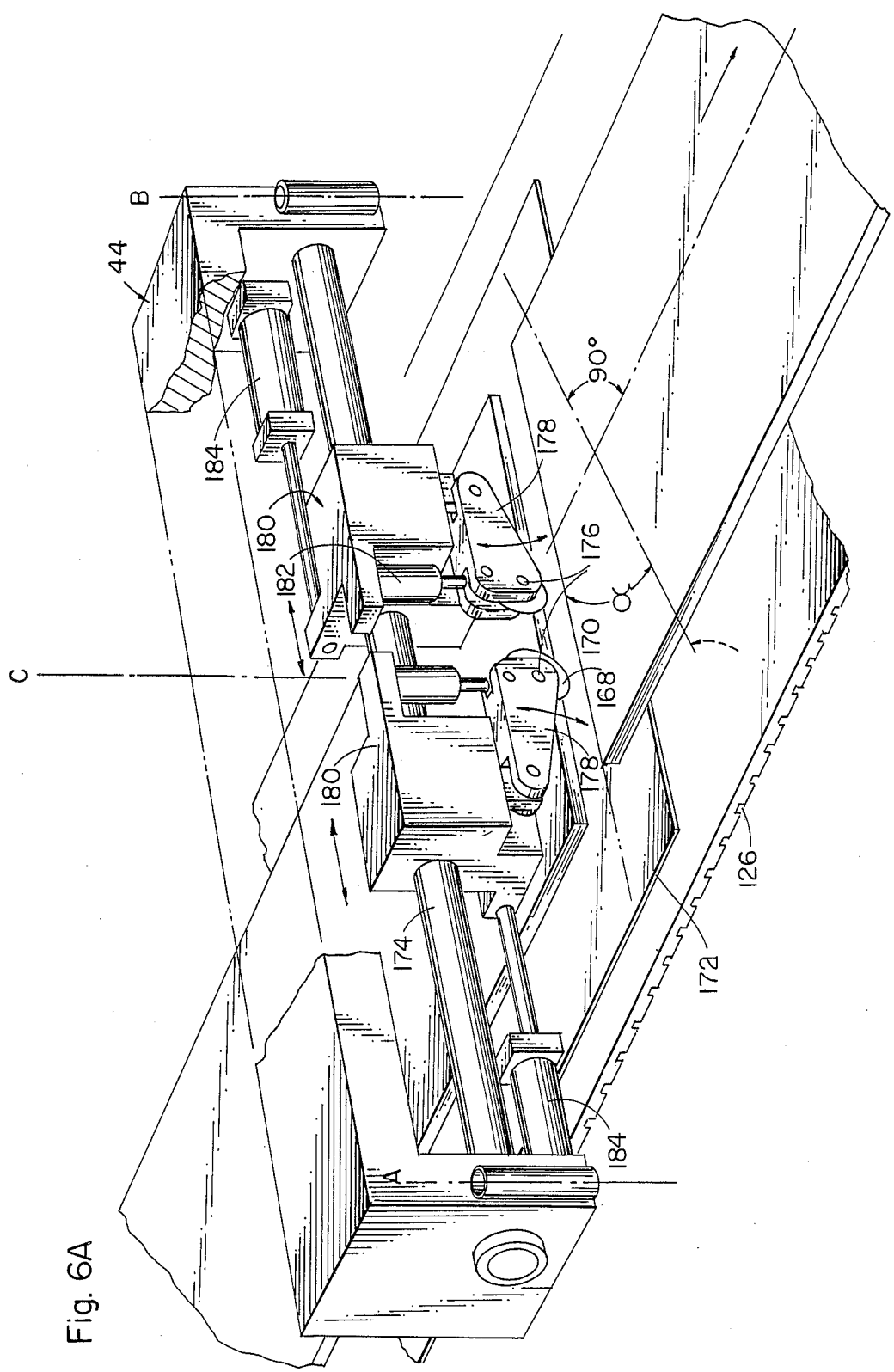
Figure 6B:
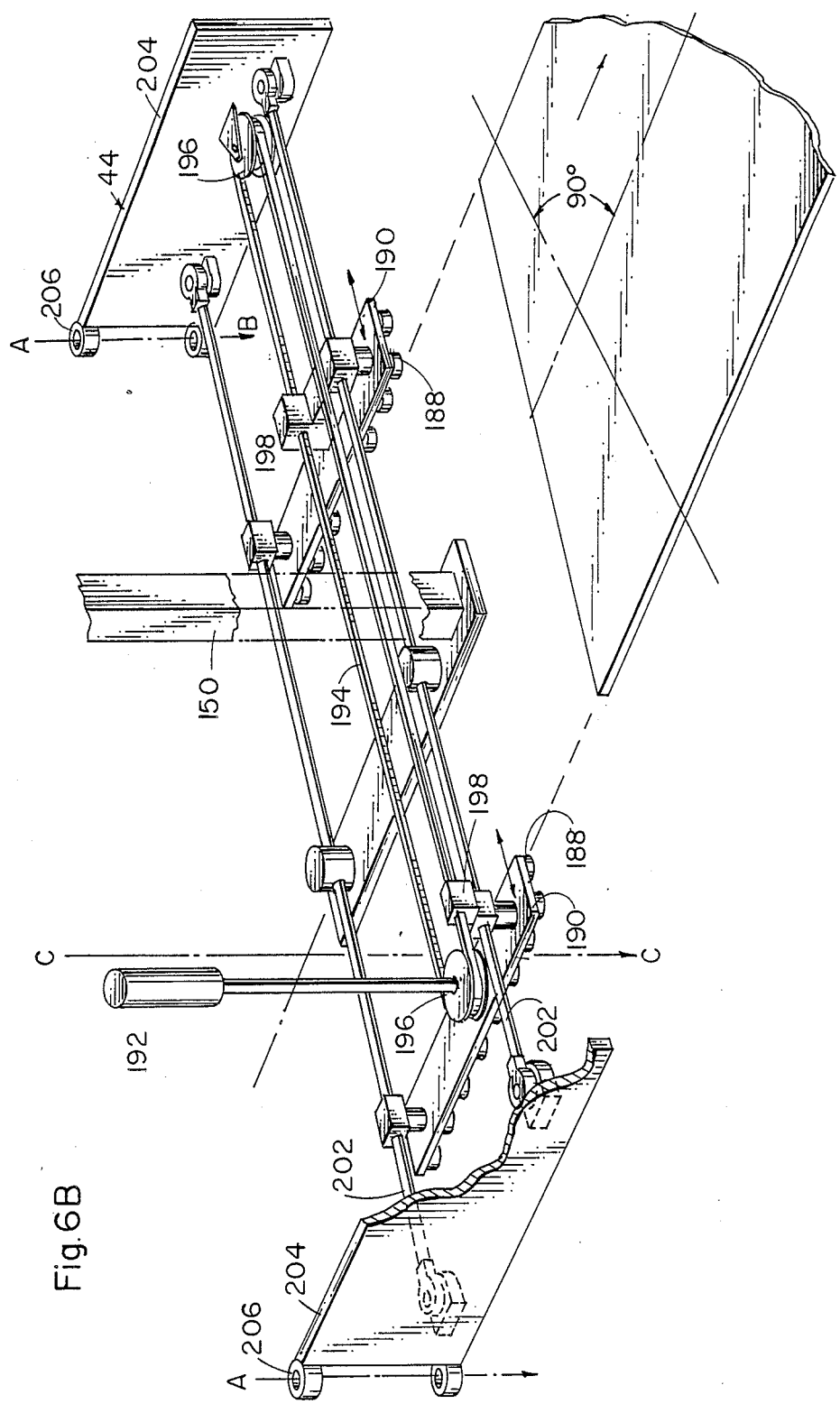

Each output conveyor 134 of the disclosed two conveyor systems is reciprocable with the intermediate conveyor 112 to which it is coupled. Each output conveyor has an articulated support structure whereby it is pivotable about a central roller 142 but only after its intermediate conveyor has been driven to its extended position. With the intermediate and output conveyors in an extended and pivoted position, the output end of the output conveyor is in close proximity to the breaker drum, a feeding location sufficiently close to the breaker drum to preclude operator involvement during the transfer of a fed strip of breaker material onto the breaker drum. Air cylinders 124 associated with each output conveyor effect the longitudinal movement of the intermediate and output conveyors while coordinated air cylinders 144 mounted on each intermediate and output conveyor effect the pivotal movement of the output ends of the output conveyors. Note particularly the lower conveyor of FIG. 5A.

An optical sensor 148 is mounted on a depending vertical support 150 to detect the leading as well as the trailing edges of the cut breaker strips. The sensing is done very accurately. The sensed output is fed to the controller 146 whereat the speed of the intermediate and output conveyor may be increased or decreased appropriately so that all cut breaker strips will be of a precise length to fully cover the entire circumference of the breaker drum with no gap or overlap. In the case of the second breaker strip, that it may fully cover the first breaker strip with no gap or overlap. The controller could also be programmed to vary the rotational speed of the drum to effect the same result.

The upper conveyor of the servicer functions to deliver the first strip of breaker material of the upper conveyor onto the breaker drum. Thereafter the lower conveyor will feed a second strip of breaker material over the initially fed breaker material from the upper conveyor. The programming of the system is such that the leading edge of the lower conveyor may be placed on the upper breaker material at any rotational position with respect to the leading edge of the first strip of breaker material on the breaker drum. FIGS. 2A through 2F show the breaker strips being delivered.

The edge sensor and a timing belt function together in a synergistic manner to measure the location of the breaker material, to track its movement and the cutting and tip alignment, all of which are correlated to the center line of the belt and material.

The tread feeding subassembly 48 is located on the side of the breaker drum remote from the servicer assembly. It is formed of parallel end rails 154 and coupled parallel side rails 156 with rollers 158 spanning the space therebetween. The rollers constitute a tread strip conveyor 160 and are driven by a motor. The upper surfaces of the driven rollers define the tread strip feed path. The tread strip feed path extends from a supply of precut strips of tread material and terminates in close proximity to the breaker drum whereby the leading edge may be fed in timed sequence to the drum rotation for applying the tread strip to the superposed breaker strips on the breaker drum.

An optical sensor is located above the tread feed path for measuring the length of each fed tread strip. Through the logic of the control assembly 46, the output of the sensor functions to vary the speed of movement of the tread strips being fed. In this manner the fed tread strip will form a complete cylinder around the breaker strips with no overlap or gap. The controller could also be programmed to vary the rotational speed of the drum to effect the same result.

Figure 8A:
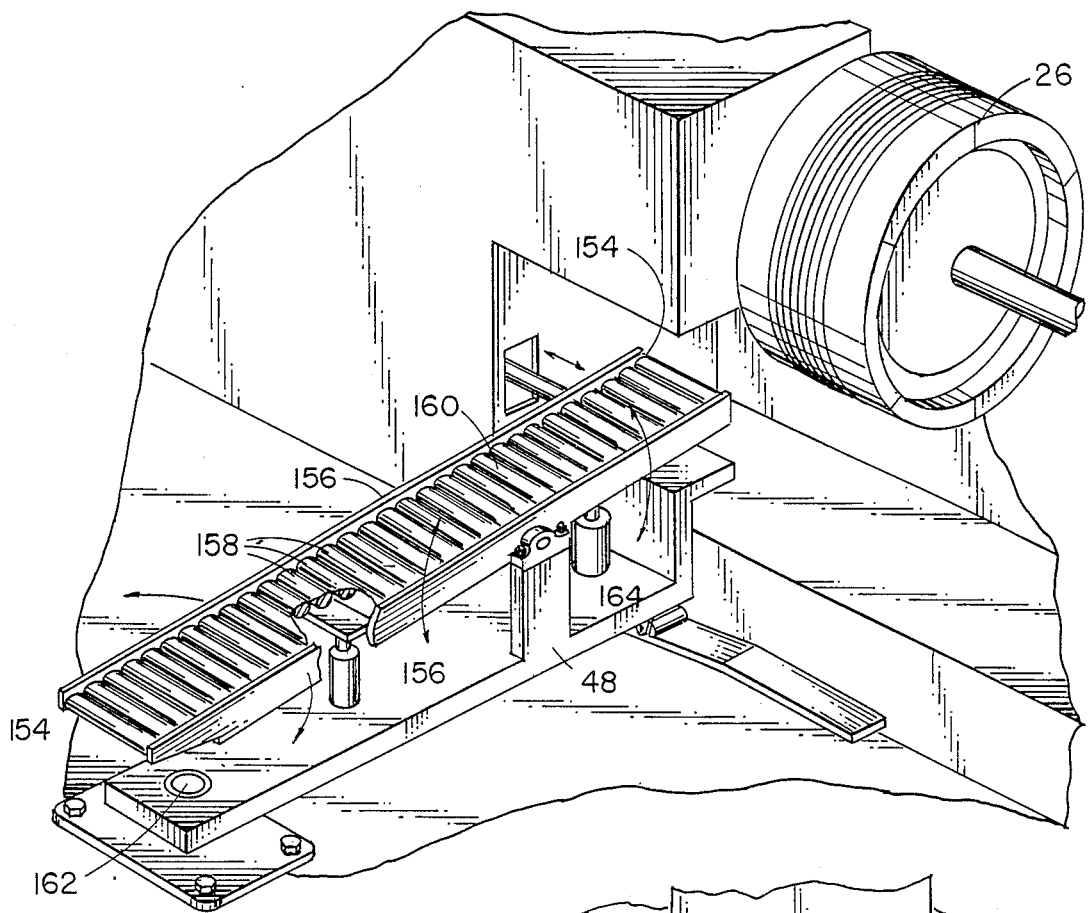
FIGS. 8A and 8B are illustrations showing the mechanisms for feeding tread material to the collapsible drum over the breaker plies.
Figure 8B:
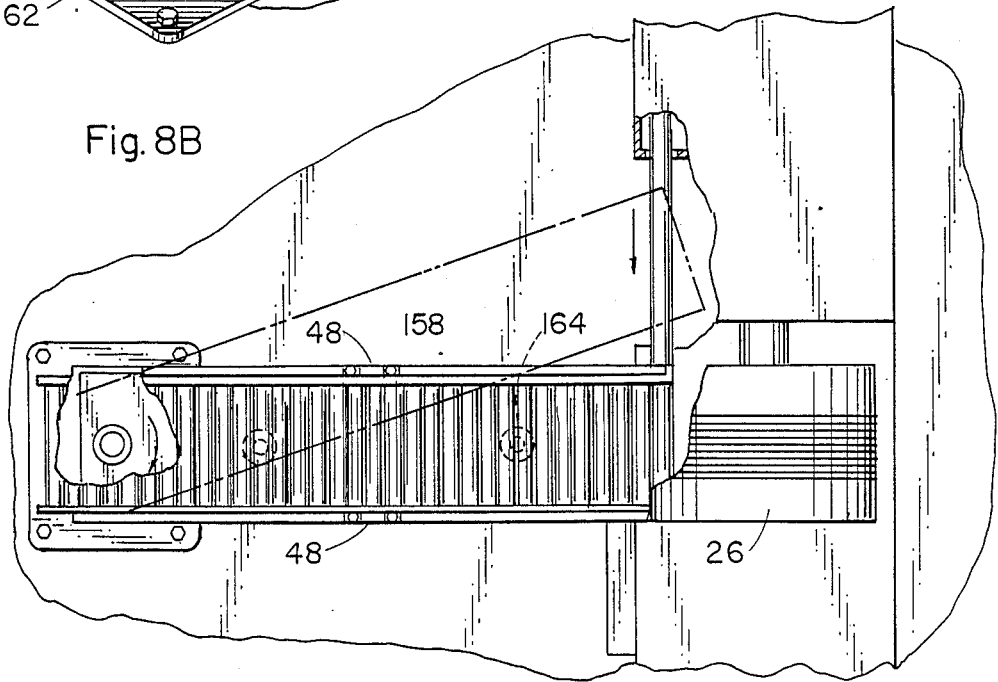

The side rails and rollers are supported by an assembly for automatically pivoting the entire tread feed subassembly about shaft 162 on a floor support and through a piston 164 to longitudinally raise and lower the output end of the tread strip conveyor. The subassembly thus moves between an operative position shown in FIG. 8B with the output end raised and located adjacent to the breaker drum and an inoperative position shown in FIGS. 8A with the output end lowered and located away from the breaker drum. This movement allows the operator access to the breaker drum to stitch the trailing end of the tread stock for completing the breaker and tread subassembly when the output end is lowered and retracted.

Cutter and Tip Aligner Subassembly

Cutting is effected by two freely rotatable knives 168 and 170 that are independently activatable but concurrently positionable at an angle with respect to the material to be cut. Since breaker material normally has steel or other hard cords from edge to edge at a specific predetermined angle, the cutters move at the same angle as the cords to cut the breaker material between the cords. It is preferred that the breaker material be cut evenly by cutting from the center of the material outwardly to the edges. In this manner the disturbing of the material from its intended central positioning is minimized.

The angle of the knives may be varied to correspond to the angle of the steel cords of the breaker material. If cutting breaker material with its cords offset at 23 degrees, for example, the operator would set the cutter track at 23 degrees, either electronically through the panel of the control assembly or mechanically.

The breaker strip material is stopped through the stopping of the conveyor for the cutting operation. The actual cutting of the breaker strips is effected by a pair of coordinated rotary knives having sharp peripheral edges adapted to cooperate with a hard metal plate or anvil 172 on the opposite side of the breaker material to be cut. The anvil is a fixed plate located above the conveyor belts but beneath the breaker material in the region where the cutting occurs. It is fixedly secured by its side edges to the frame structure. The knives and anvil are commonly supported by side brackets through an upper support shaft 174, for varying the horizontal path of travel of the cutters to equal the angle of the cords in the breaker strip material to be cut.

The rotary knives are each mounted on a knife supporting shaft 176 for free rotation during their cutting movement which is effected by the breaker material and anvil over which they roll. The knife-supporting shafts are, in turn, supported by side plates 178. The adjacent remote ends of the plates support the rotary knives while their opposite ends are mounted on plate-supporting shafts to effect the pivoting of the side plates and knives into and out of cutting contact with the breaker strips and anvil. The side plates with their knives are independently reciprocable longitudinally along a track 174 through a carriage assembly 180 supporting the side plates. In this manner, the knives are independently pivotable through pneumatic pistons 182 into and out of contact with the anvil and the breaker strip to be cut. The knives are also independently movable across the anvil and the breaker material to be cut through pistons 184.

Figure 7A:
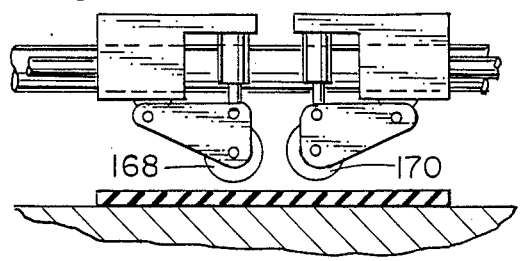
FIGS. 7A-7E are front elevational views of the cutter mechanisms illustrating their sequential movement through a cycle of operation.
Figure 7B:
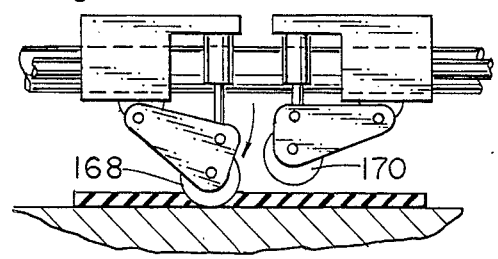
Figure 7C:
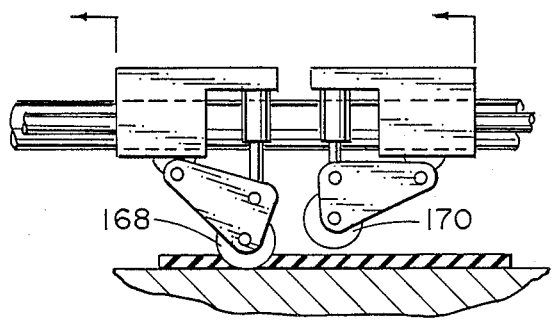
Figure 7D:
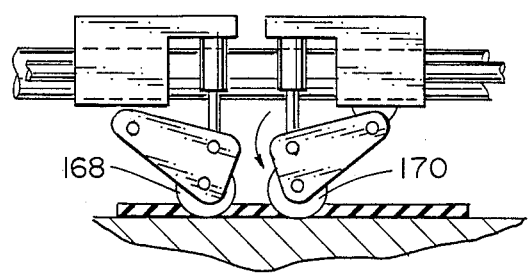
Figure 7E:
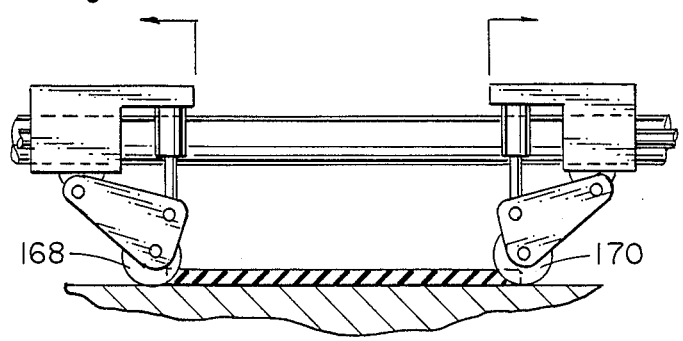

In operation and use, the knives are located in their raised position as shown in FIG. 7A adjacent to each other over a central extent of the breaker strip to be cut. The breaker strip is stopped for the cutting thereof. Cutting begins with the inner or longitudinally rearwardly moving knife 168 pivoting downward to pierce the breaker strip material between adjacent steel cords. Note FIG. 7B. The lowered knife then begins movement inwardly or longitudinally rearwardly with respect to the material to initiate the cutting. The outer or longitudinally forwardly moving knife 170 moves along the track concurrently with the inner knife but in a raised position. Note FIG. 7C. Thereafter, as shown in FIG. 7D, the outer knife pivots downwardly into the cut in the breaker strip effected by the inner knife and then moves outward or longitudinally forward. The inner and outer knives are thus moving at a common speed, but in opposed directions, both knives traveling toward its adjacent edge and arriving at their edges at about the same time as shown in FIG. 7E. Both knives then pivot to their raised positions after the cut has been completed and return to their rest positions adjacent to the longitudinal center line of the breaker strip material and conveyor belts. This mode of operation allows a precise cut, with the knives moving in opposite directions and arriving at the edges at the same time this minimizes the movement of the edges away from the longitudinal centerline.

In practice it has been found that some movement of the edges of the breaker strip material will be laterally displaced during cutting. This is particularly true of the leading edge which is at an acute angle of, for example, 23 degrees from the longitudinal centerline of the material and conveyor belts in a preferred operative embodiment.

Rather than attempt to preclude displacement of the leading edge as through clamps and magnets, it has been found easier to merely align such edge after the cut. This is effected by sets of rollers 188 located about parallel vertical axes on the sides of the cutter and anvil adjacent to the edges of the conveyor. Roller bearings are located on the support rods for the rollers to minimize frictional loss. A common plate 190 supporting the rollers adjacent to their upper edges is provided for supporting each set of rollers. The rollers will shift the leading edge back toward the longitudinal centerline a predetermined distance for the accurate realignment of the leading edge and the entire breaker strip.

The primary force effecting realignment of the tip of the cut breaker material is a motor 192 to move a drive belt 194 on rollers 196. The roller-supporting plates are mounted on rotatable guides 198 secured to the drive belt for movement toward and away from the cut material but always parallel with the longitudinal center line of the fed material. The belt 194 is supported on rollers and move both the forward and rearward plates and their supported sets of rollers equally and oppositely to align the both edges of the cut breaker material at locations adjacent to their cuts. Parallelism is maintained through the primary guides and secondary guides being slidably received in parallel rods 202. The rods are pivotally secured to vertical side plates 204 movable on vertical axes 206 to a predetermined angle equal to the angle of breaker cut. Sensors 210 prior to the input conveyor belts sense the width of the breaker material to be cut and drive the motor for the plates and rollers 188 of the tip aligner 44 so that they will move outwardly from, and inwardly towards, the edges of the cut material to effect the trapping, squeezing and repositioning of the edges of the cut breaker material when in position between the rollers 188.

The movement and extent of movement of the tip aligner rollers is effected through mechanisms as shown. Such movement is determined by the width of the material in the programmer as read by the width sensor and material location as determined by the timing belts and their output.

Controller Assembly and Method

A controller assembly 46 dictates the operational events of the second stage tire building machine and the method of operation as described above including the carcass and breaker drum assemblies 24, the servicer assembly 38, the cutter and tip aligner assembly 44 and the robot assembly 52. The controller 46 is fully programmable by the operator through the control panel to vary the mode of operation of the various assemblies and component subassemblies and elements as may be desired to accommodate the fabrication of green tires of various characteristics from carcasses and breaker and tread strips of various characteristics.

The controller 46 provides the operator with various timed windows of operation such as for bringing the carcass onto the pre-inflator at the input station 214 and for removing the green tire from the inspection or output station. A window of operation is meant to be a predetermined time period in the sequence of operation of the machine during which the operator must perform a particular task or step in the sequence of operations otherwise the machine will cease its next sequential function and stop its further functioning. Another window of operation is provided for placing a tread strip on the tread conveyor. In all other aspects, the controller drives the machine continuously and automatically without operator involvement.

Inputs to the controller assembly 46 as set forth above include the breaker material width sensors 210 between the preliminary and input conveyors, the breaker strip length sensors 148, and the tread strip length sensor. Outputs from the controller assembly, as set forth above, include the drives for the preliminary conveyors and feed rolls, the breaker material conveyors, the tread material conveyor, the cutter and aligner subassembly, the drum assemblies, stitcher and robot.

The method of operation basically involves the fabricating of a green tire 14 from a carcass 12 on a second stage tire building machine including the steps of providing a first inboard station for loading, shaping and stitching a first stage tire carcass, providing an outboard second station 16 axially offset from the first station for assembling a breaker and tread cylinder, feeding breaker strips to the second station, feeding a tread strip to the second station 16 for the completion of the breaker tread and cylinder, transporting the breaker and tread cylinder 20 from the second station 16 onto the periphery of the carcass 12 for the formation of a green tire 14 by a transfer ring 36 and then transporting the green tire 14 to an intermediate location to transport the carcass to the first station 24 and the green tire to a final location by a robot 52, and coordinating the movement of the breaker strip, tread strip, transfer ring and robot by a controller 46 in a continuous and automatic cycle of operation.

The various sensors and control functions act together to synchronize the various component elements, subassemblies and assemblies of the machine. They also allow for the programmability of such functions to provide flexibility through the controller, all precisely determined by the precise measurements initiated with the toothed timing belts and the associated sensors.

Further specifics involved in the method of operation are detailed more completely in the descriptions of the various assemblies, subassemblies and components as described above.

In addition, further associated details of operation and construction are set out in U.S. application Ser. No. 199,081 filed concurrently herewith and assigned to the assignee of the instant application, the subject matter of which is incorporated by reference herein.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and scope of the invention.

Now that the invention has been described;
What is claimed is:

1. A servicer for conveying upper and lower breaker strip material onto a rotating cylindrical surface comprising:
    upper and lower conveyors, each with an input end and output end, to sequentially feed the upper and lower breaker strip material along upper and lower paths of travel onto the rotating cylindrical surface; each conveyor including an input conveyor portion, an intermediate conveyor portion and an output conveyor portion, each portion including a separate conveyor belt, the input and intermediate conveyor portions having magnets beneath their conveyor belts for conveying fed material thereabove and the output conveyor portion having magnets thereabove for conveying fed material therebeneath;
    a roll of breaker strip material located in association with each conveyor at its input end;
    first positioning means to move the intermediate and output conveyor portion of each conveyor longitudinally along the feed path between a first extended position adjacent to the rotating cylindrical surface and a second position remote therefrom;
    second positioning means to pivot only the output end of the output conveyor portion of each conveyor in said first extended position between a raised inoperative position and a lowered position in operative association with the rotating cylindrical surface;
    cutter means in each path of travel to cut the conveyed breaker strip material into strips of predetermined lengths; and
    drive means associated with the conveyors to move the cut breaker strip material onto the rotating surface.

2. The servicer as set forth in claim 1 and further including an additional conveyor to feed precut strips of tread material onto the rotating surface over the breaker strips.

3. The servicer as set forth in claim 2 wherein the additional conveyor means is located on the side of the rotating surface remote from the upper and lower conveyors.

4. The servicer as set forth in claim 3 wherein the additional conveyor means is movable between a position adjacent to the rotating surface and to a position remote therefrom.

5. The servicer as set forth in claim 4 and further including a programmable controller to coordinate and effect the moving and pivoting of the conveyors.

6. The servicer as set forth in claim 5 wherein the movement of the additional conveyor means is coordinated and effected by the controller means.

7. In a tire building machine servicer, material feeding apparatus for sequentially conveying breaker strips with magnetic cords onto a rotating surface comprising:
    conveyor means with an input end and an output end to sequentially convey the leading edge of each breaker strip along a feed path onto the rotating surface, the conveyor means including an input conveyor portion, an intermediate conveyor portion and an output conveyor portion, each portion including a separate conveyor belt, the input and intermediate conveyor portions having magnets beneath their conveyor belts for conveying fed material thereabove and the output conveyor portion having magnets thereabove for conveying fed material therebeneath;
    a source of breaker material located in association with the input end of the conveyor means;
    first positioning means to move the intermediate and output conveyor portion longitudinally along the feed path between a first extended position adjacent to the rotating surface and a second position remote therefrom;
    second positioning means to pivot only the output end of the output conveyor portion in said first extended position with respect to the intermediate conveyor portion between a lowered position in operative association with respect to the rotating surface and a raised inoperative position;
    cutting and alignment means in the feed path to cut and align the breaker strip material into aligned strips of predetermined lengths; and
    drive means in association with the conveyor means to convey the cut breaker strip material onto the rotating surface.

8. The feed apparatus as set forth in claim 7 and further including detector means to sense the length of cut breaker strip material and to vary, in response thereto, the relative speed between the drive means and the rotating surface.

9. The feed apparatus as set forth in claim 7 wherein the conveyor belts are in a closed loop configuration with a toothed configuration on their interior surface and further including toothed pulley means for driving the conveyor belts.

10. The feed apparatus as set forth in claim 9 and further including control means responsive to the rotational position of the pulley means for detecting the location of the breaker material as it is fed by the conveyor belts.

11. The feed apparatus as set forth in claim 7 wherein the source of breaker material feeds the breaker material at a speed correlated with the speed of the conveyor means.

12. The feed apparatus as set forth in claim 7 and further including control means to detect the width and position of the fed material and to activate the cutting and alignment means as a function of the detected width and position.

* * * * *